United States Patent [19]

Yokoi et al.

[11] Patent Number: 5,069,833

[45] Date of Patent: Dec. 3, 1991

[54] INJECTION METHOD

[75] Inventors: Hidetoshi Yokoi, 2-8-20 Nakamachi, Setagaya-ku, Tokyo; Toshikato Okumura, Toyama; Yukio Nakamura, Kawaguchi; Noriei Yoneoka, Toda; Syuiti Hachikawa, Toyama, all of Japan

[73] Assignees: Hidetoshi Yokoi, Tokyo; Kabushiki Kaisha Fujikoshi, Toyama, both of Japan

[21] Appl. No.: 654,185

[22] Filed: Feb. 13, 1991

[30] Foreign Application Priority Data

Feb. 23, 1990 [JP] Japan .................................. 2-040973

[51] Int. Cl.$^5$ .................. B06B 3/00; B29C 35/08; B29C 37/02; B29C 45/38
[52] U.S. Cl. ........................................ 264/23; 264/25; 264/71; 264/72; 264/155; 264/162; 264/163; 425/174.2; 425/553
[58] Field of Search ................ 264/23, 25, 69–72, 264/161, 328.11, 328.15, 336, 154–156, 162, 163; 425/425, 806, 554, 553, 556, 577, 174.2

[56] References Cited

U.S. PATENT DOCUMENTS

| Re. 31,235 | 5/1983 | McNeely et al. | 264/155 X |
|---|---|---|---|
| 3,649,728 | 3/1972 | Honsho et al. | 264/156 X |
| 3,891,739 | 6/1975 | Lawson | 264/155 |
| 4,254,075 | 3/1981 | Menzel et al. | 264/156 X |
| 4,387,068 | 6/1983 | Llabrés et al. | 264/155 X |
| 4,466,934 | 8/1984 | Cane et al. | 264/106 |
| 4,952,354 | 8/1990 | Yokoi et al. | 264/69 |

Primary Examiner—Jan H. Silbaugh
Assistant Examiner—Karen Aftergut
Attorney, Agent, or Firm—Spencer & Frank

[57] ABSTRACT

An injection method for making a hole in an injection molded plastic article comprising the steps of filling a mold cavity with a molten plastic and cooling the mold to effect gate seal. A first hole-making punch and a second punch, which are slidably inserted in a bore provided in the mold coinciding with the hole to be made in the article in an axial direction in which a movable mold half is opened and closed, are vibrated with high frequency after gate seal is completed to soften the solidified plastic between the two punches. The punches are then displaced with respect to the bore when the plastic is softened to make the hole. A second injection method comprises the step of making the hole in the molded article by sliding the punches during both dwelling and cooling subsequent to the completion of dwelling after filling the mold with the molten plastic and before gate seal is effected. While said punches are subject to vibration with high frequency or slow reciprocating motion, the side surfaces of the punches are contacted against the hole inner surface to obtain a good cut surface of the hole in the molded article.

5 Claims, 2 Drawing Sheets

INJECTION METHOD

CROSS-REFERENCE

This application is related to allowed U.S. application Ser. No. 07/599,111, entitled "Degating Method", filed on Oct. 17, 1990 by Okumura et al.

FIELD OF THE INVENTION

The present invention relates to injection molding of plastics and, more particularly, to an injection method for making a hole in an injection molded plastic article in a mold in an ideal condition during molding of the article before the finished article and the runner are taken out separately.

BACKGROUND OF THE INVENTION

In an injection mold of plastic articles, conventional way of making a hole in an injection molded article is effected either by fixing a pin which is configured to have a complementary outer surface to the hole inner surface to be made in a mold cavity prior injection mold, or by subsequent boring step after the article is taken out of the mold.

However, in the above-described method of fixing a pin in a mold cavity, molten plastic material in the cavity flows around the pin and join together forming a linear mark or weld mark. Up to the present, it was impossible to eliminate this weld mark entirely. Further, the weld mark is not only of bad appearance, but also defective in having low strength and requires a reinforcemental thickening of the molded article.

Also, the above-described latter method of subsequent boring is effected to avoid such a weld mark. This subsequent boring of the hole is made after the mold is cooled and the article is taken out of the mold. Although this method is very commonly used as a sure method of eliminating the weld mark, it is not ideal method since it requires additional steps after injection mold, and furthermore, effects a high production cost and increase in a faulty article having cuts or cracks etc.

SUMMARY OF THE INVENTION

It is an object of the present invention to provide an accurate injection method for forming a hole in an injection molded plastic article which eliminates the weld mark on the article without requiring the above-described subsequent boring steps, and which injection method can obtain a precise and fine injected surface in the mold.

The above object is achieved in accordance with the teachings of the first method of the invention by an injection method for making a hole comprising the steps of: filling the cavity of a mold with a molten plastic, and cooling the mold to effect gate seal. A first hole-making punch and a second punch, which are slidable inserted in a bore provided in the mold coinciding the hole to be made in the article in an axial direction in which a movable mold half is opened and closed, are vibrated with high frequency after gate seal is completed to soften the solidified plastic between the two punches. The punches are then displaced with respect to the bore when the plastic is softened to make the hole.

In this method, at least one of the punches is vibrated with high frequency or reciprocated in the axial direction in which the mold is opened and closed. The vibrational energy softens the plastic between the two punches. During or after dwelling, the hole is formed. The hole surface is contacted and rubbed against the punch, as a result, an aesthetically excellent and precise product having no weld mark nor linear flow mark is obtained without requiring the subsequent boring steps nor additional cost.

A second injection method comprises the step of making the hole in the molded article by sliding the punches during both dwelling and cooling subsequent to the completion of dwelling after filling the mold with the molten plastic and before gate seal is effected. While said punches are subject to vibration with high frequency or slow reciprocating motion, the side surfaces of the punches are contacted against the hole inner surface to obtain a good cut surface of the hole on the molded article. This method provides nearly the same effect as the first method.

DESCRIPTION OF THE PREFERRED EMBODIMENTS

Figure 1:
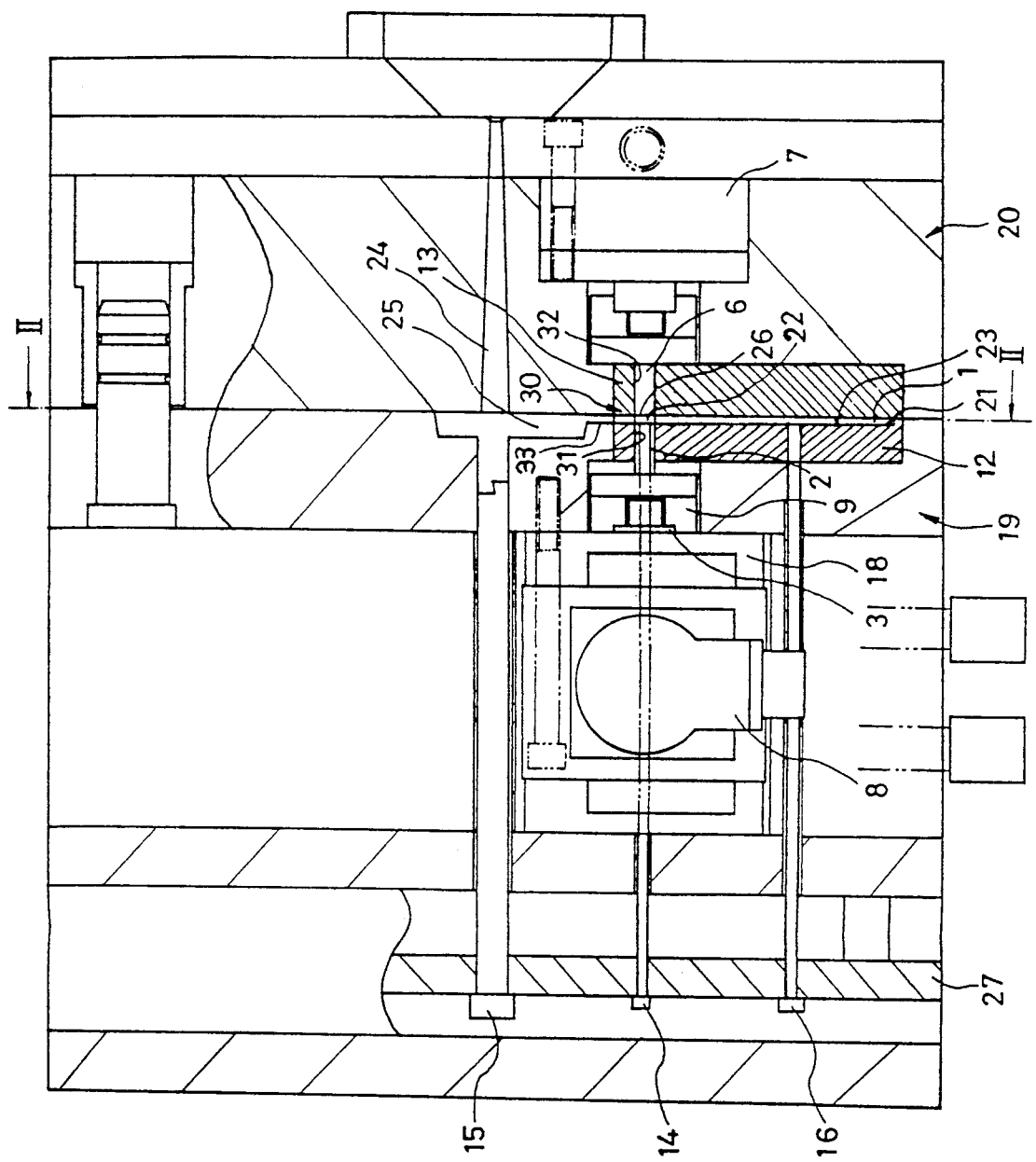
FIG. 1 is a cross-sectional view of main portions of a mold carrying out an injection method according to the invention.

Referring to FIG. 1, there is shown a mold having a single cavity or core, the mold being used to carry out an injection method for making a hole in an injection molded plastic article according to the invention. The mold comprises a movable mold half 19, a fixed mold half 20, a movable insert die 12 removably mounted in the movable mold half 19, a fixed insert die 13 removably mounted in the fixed mold half 20, a hole 22, a sprue 24, a gate 33, a runner 25 connecting the sprue 24 to the gate 33, a hole-making punch 2, and a hole-making bias punch 6. The movable mold half 19 can be moved away from the fixed mold half 20 to open the mold, the fixed mold half 20 being mounted to a device (not shown). In the illustrated condition, the movable mold half 19 is in contact with the fixed mold half 20. Resin or plastic 1 is injected into the cavity 21 to mold an article 23. The portion of the mold article 23 which is located at the hole 22 is indicated by reference numeral 30. The hole-making punch 2 is slidably inserted in a bore 31 formed in the movable insert die 12 which forms a part of the movable mold half 19. The bore 31 is so formed to coincide with the hole 22 in an axial direction in which the movable mold half 19 is opened and closed.

The bore 31 is so located that the portion 30 of the molded article is cut off by the punch 2. The fixed insert die 13 cooperates with the movable insert die 12 to form the cavity 21 or core on the surface of the fixed mold half, against which the movable mold half bears. The fixed insert die 13 which forms a part of the fixed mold half 20, is provided with a bore 32 registering with the bore 31 and coinciding with the hole 22 in the axial direction in which the movable mold half 19 is opened and closed. The bias punch 6 is slidably inserted in the bore 32 such that its surface 26 is contactable with the resin 1 filled between the two surfaces of the two punches 2 and 6.

The mold further includes a hydraulic servo cylinder 18 and a hydraulic bias cylinder 7 to which the hole-making punch 2 and the hole-making bias punch 6 are respectively held. When the punch 2 vibrates with high frequency, the vibration is transmitted to the punch 6 via the resin 1 filled between the two punches 2 and 6 in a manner synchronously with the movement of the punch 2, so that when the punch 2 vibrates with high frequency, the bias punch 6 also vibrates similarly. The punch 2 is driven independent of the movable insert die 12. The bias punch 6 can move relative to the fixed insert die 13.

Figure 2:
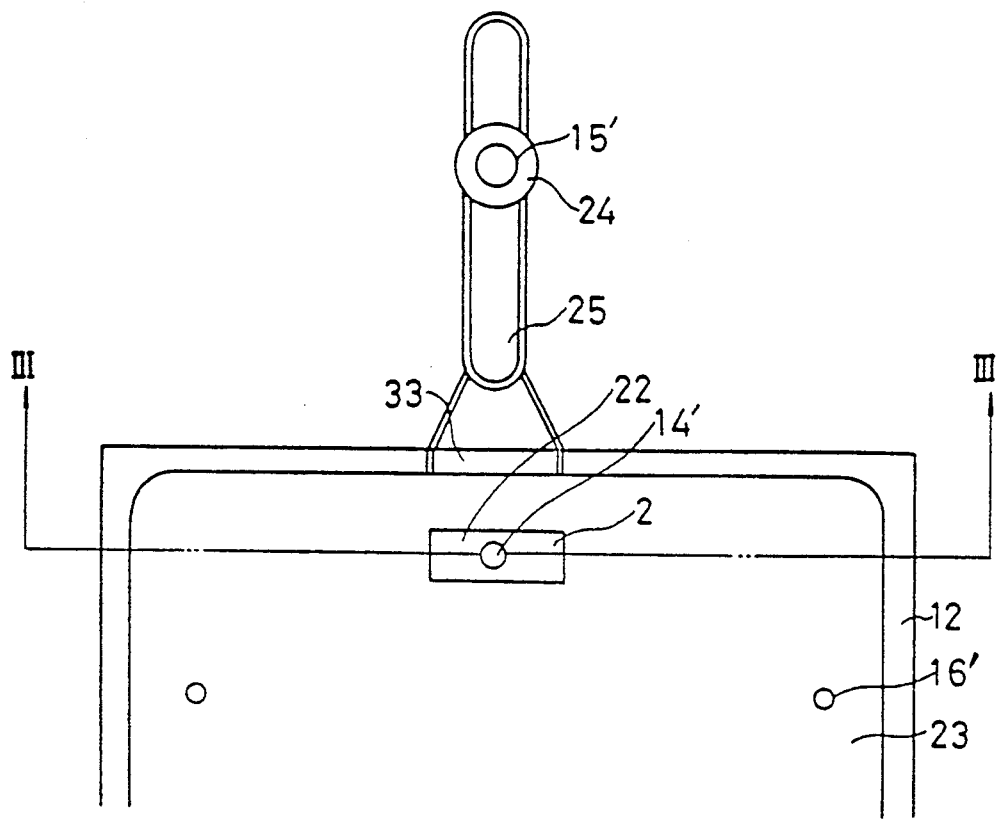
FIG. 2 is a cross-sectional view taken on line II—II of FIG. 1.

Also shown in FIG. 1 are an ejector plate 27, a runner ejector pin 14 located at the position of the gate, a sprue ejector pin 15, a molded article ejector pin 16, a hydraulic servo cylinder rod 3, a hydraulic servo cylinder joint adapter 9, and a servo valve 8. One end of each of the ejector pins 14, 15, 16 is fixed to the ejector plate 27. These pins 14-16 extend through the movable mold half 19 or the hole-making punch 2 and through the hydraulic servo cylinder rod 3. The positions of the ejector pins 14-16 are indicated by 14', 15', 16', respectively, in the cross-sectional view of FIG. 2.

Figure 3:
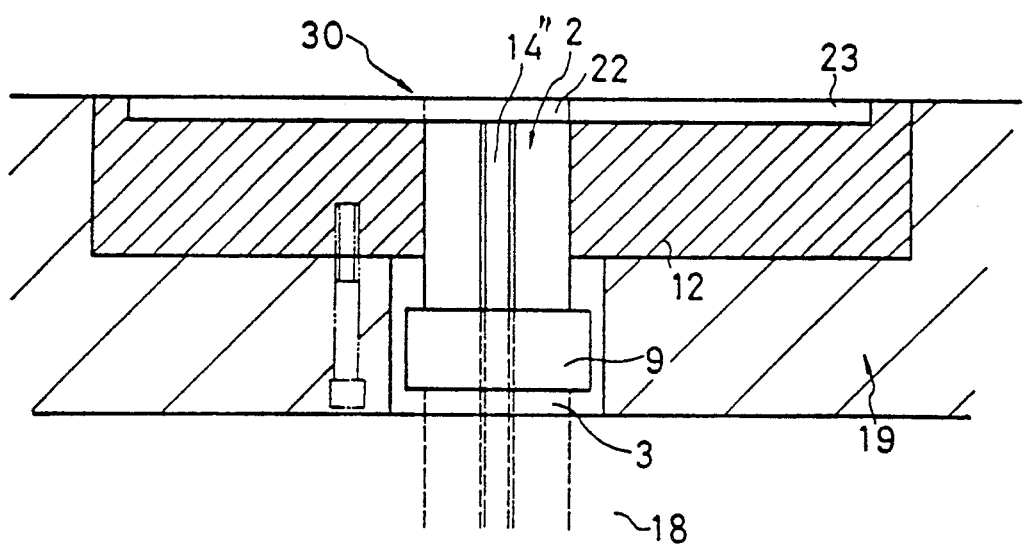
FIG. 3 is a cross-sectional view taken on line III—III of FIG. 2.

FIG. 3 shows the connection of the hole-making punch 2 with the hydraulic servo cylinder 18. The punch 2 is connected with the hydraulic servo cylinder rod 3 by the hydraulic servo cylinder joint adapter 9. The cylinder 18 is fixedly mounted in the movable mold half 19 and actuated by a device (not shown) and the servo valve 8. Thus, the joint adapter 9 and the punch 2 ca be vibrated or reciprocated with high frequency.

The hydraulic bias cylinder 7 is fixedly mounted in the fixed mold half 20 actuated by a device (not shown). Movement of the hole-making punch 2 is so transmitted to the hole-making bias punch 6 via the injected resin 1 between the two punches, that the bias punch 6 is made to move in a manner synchronously with the punch 2. The cylinders 18 and 7 may be mounted outside the mold halves 19 and 20, respectively.

One injection method for making a hole in an injection molded plastic article according to the invention is now described. When the resin is started to be injected into the sprue 24 from the front end of the nozzle of an injection molding machine (not shown), the resin 1 flows through the sprue 24, the runner 25, the gate 33 and the hole 22. Then, the resin fills in the cavity 21.

During the injection or dwelling, the hole-making punch 2 and the hole-making bias punch 6 are held in the illustrated positions by the hydraulic servo cylinder 18 and the hydraulic bias cylinder 7, respectively. After the completion of the filling, cooling step is effected while the pressure is maintained or held. Since, plastics contract as they are cooled, additional resin must be supplied in the dwelling step. The resin is cooled and solidified around the gate 33, thus sealing of the gate 33 is completed. Because the cross section at the gate 33 is smaller than at any other location inside the cavity 21, the resin at the gate 33 is cooled more quickly than the resin forming the article, therefore, after the gate 33 is sealed, the effect of the dwelling is lost. Consequently, the molded article 23 is by no means affected if the resin is made a hole on the completion of the seal, i.e., during both the dwelling step and the subsequent cooling step. After the gate 33 has been completely sealed the servo cylinder 18 is vibrated with high frequency by a device (not shown). The reciprocating movement of the cylinder 18 vibrates with high frequency the hydraulic servo cylinder joint adapter 9 and the hole-making punch 2. The vibrational energy heats up and softens the resin at the boundary between the cavity 21 and the hole 22 and that of between the two punches 6 and 2.

When the resin softens at the above boundary area around the hole 22, the hole-making punches 2 and 6 are displaced to make the hole 22 in the plastic article 23. Since the softening and the cutting of the resin are completed only in several seconds, these two steps can be carried out simultaneously with the cooling of the molded article. In this way, the productivity is not inferior to the productivity of the prior art molding.

After the hole-making and the cooling are completed, the movable mold half 19 and the movable insert die 12 are caused to recede to open the mold, in the same way as in normal injection molding. The molded article 23, the gate 33 and runner 25 are taken out. Thus, the molding process is completed. The hole-making punch 2 and the hole-making bias punch 6 are returned to their original positions by devices (not shown) prior to the next mold closing or clamping. In this way, preparations for the next molding are made.

Further, after the hole-making step and prior to the opening of the mold halves, the hole-making punch 2 may be vibrated with high frequency by the servo cylinder 18 via the hydraulic servo cylinder joint adapter 9 for a short time, so that, the resin inner surface of the hole 22 is made to contact and rub against the side surface of the vibrating punch 2. As a result, the inner surface of the hole 22 can be finished more smoothly. It is also possible to slowly reciprocate the hole-making punch 2 for a short time to gain the same smooth inner surface of the hole 22.

Another injection method according to the invention is next described. This injection method uses the mold shown in FIGS. 1-3 in the same way as the method described already. When molten resin is started to be injected into the sprue 24 from the front end of the nozzle of an injection molding machine (not shown), the molten resin 1 passes through the sprue 24, the runner 25, the gate 33 and the hole 22 to fill in the cavity 21. When the filling is completed, the resin is started to be cooled while retaining the pressure. When the resin starts to cool and solidify at the gate 33 before the gate 33 is sealed, the viscosity of the resin at the gate 33 increases greatly. In this state, it is impossible to compensate for the contraction by the dwelling, but the resin is sufficiently soft to cut.

More specifically, in the dwelling step and cooling step subsequent to the completion of the dwelling, the resin has usually the smallest cross section at the gate 33 and will cool and solidify first. Therefore, the resin is too hard to be injected into the cavity 21 against the pressure but sufficiently soft to cut during the time interval starting with a lapse of a certain time from the beginning of the dwelling step. During this time interval, the hole-making punch 2 is displaced in the axial direction in which the movable mold half 19 is opened and closed by the hydraulic servo cylinder 18 to remove the resin in the hole 22. After the hole-making punch 2 is displaced, cylinder 18 is actuated to vibrate the punch 2 with high frequency only for a short time. Just when the resin in the hole 22 is removed, the removed surface is still soft, and side surfaces of the hole-making punches 2 and 6 are made to contact and rub against the removed inner surface of the hole 22 for lapping the inner surface of the hole of the molded resin article. Hence, the inner surface of the hole is finished to give a gloss to it. The cutting step and the subsequent rubbing step are completed only in several seconds and so the productivity is not inferior to the productivity of the prior art injection molding. Because the hole is made in the resin when the effect of the dwelling ceases, the molded article is not adversely affected at all.

Depending on the kind of resin, the hole-making punch 2 can be reciprocated slowly to rub the side surface of the hole-making punch 2 against the inner surface of the hole 22, instead of imparting high-frequency vibration to the punch 2 during the rubbing step after the hole-making step. Also in this case, a well glossed inner surface of the hole 22 is obtained. After the hole-making and rubbing steps, the mold is opened in the same way as in the ordinary injection molding. The molded article, the gate and the runner are then taken out of the cavity 21, thus completing the molding process. The hole-making punch 2 and the bias punch 6 are returned to their original positions by devices (not shown) before the next mold clamping. In this manner, preparations for the next molding are made.

What is claimed is:

1. An injection method for making a hole in an injection molded plastic article comprising the steps of:
    filling a cavity of a mold with a molten plastic, the mold having a fixed mold half, a movable mold half, and a gate, the mold halves being provided with bores coinciding with the hole to be made in the article in an axial direction in which the movable mold half is opened and closed, the bores having a first hole-making punch and a second punch axially and slidably inserted in their respective ones of the bores, movement of the first punch in the axial direction being transmitted to the second punch via the plastic filled between the two punches in a manner synchronously with the movement of the first punch;
    cooling the molten plastic at the gate in the mold so as to seal the gate;
    thereafter vibrating with high frequency one of the two punches after the gate is sealed during both dwelling and the cooling subsequent to dwelling, so that the vibrational energy softens the plastic between the two punches; the step of vibrating with high frequency also including transmitting the vibration of the first punch to the second punch through the plastic filled between the two punches, such that the second punch moves synchronously with the first punch to heat and soften the plastic for making the hole in the plastic when the two punches are further displaced together to make the hole in the softened plastic; and
    displacing the vibrated punch when the plastic is softened to make the hole in the plastic of the injection molded plastic article.

2. The injection method of claim 1, wherein the step of vibrating the two punches also including vibrating the two punches at the same time synchronously; and further, the step of displacing the punch is followed by the step of causing the punch to vibrate with high frequency for a short time causing a side surface of the punch to contact and rub against an inner surface of the hole to smoothly finish the hole.

3. The injection method of claim 1, wherein the step of vibrating the two punches also including vibrating the two punches at the same time synchronously; and further, the step of displacing the punch is followed by the step of causing a side surface of the punch to contact against an inner surface of the hole for a short time while slowly reciprocating the punch to smoothly finish the hole.

4. An injection method for making a hole in an injection molded plastic article comprising the steps of:
    filling a cavity of a mold with a molten plastic, the mold having a fixed mold half, a movable mold half, and a gate, the mold halves being provided with bores coinciding with the hole to be made in the article in an axial direction in which the movable mold half is opened and closed, the bores having a first hole-making punch and a second punch axially and slidably inserted in respective ones of the bores, movement of the first punch in the axial direction being transmitted to the second punch via the plastic filled between the two punches in a manner synchronously with the movement of the first punch;
    dwelling and cooling the molten plastic in the mold so as to seal the gate and form the injection molded plastic article;
    sliding one of the punches in the axial direction with respect to the bores to make the hole in the molded plastic article during both dwelling and cooling subsequent to completion of the dwelling; and
    bringing a side surface of the slided punch into sliding contact with an inner surface of the hole for a short time while vibrating with high frequency the slided punch, to finish the inner surface of the hole in the injection molded plastic article.

5. An injection method for making a hole in an injection molded plastic article comprising the steps of:
    filling a cavity of a mold with a molten plastic, the mold having a fixed mold half, a movable mold half, and a gate, the mold halves being provided with bores coinciding with the hole to be made in the article in an axial direction in which the movable mold half is opened and closed, the bores having a first hole-making punch and a second punch axially and slidably inserted in their respective ones of the bores, movement of the first punch in the axial direction being transmitted to the second punch via the plastic filled between the two punches in a manner synchronously with the movement of the first punch;
    dwelling and cooling the molten plastic in the mold so as to seal the gate and form the injection molded plastic article;
    sliding one of the punches in the axial direction with respect to the bores to make the hole in the molded plastic article during both dwelling and cooling subsequent to completion of the dwelling; and
    bringing a side surface of the slided punch into sliding contact with an inner surface of the hole for a short time while imparting slow reciprocating movement to the slided punch, to finish the inner surface of the hole in the injection molded plastic article.

* * * * *